United States Patent [19]
Mitsch

[11] Patent Number: 5,785,742
[45] Date of Patent: Jul. 28, 1998

[54] CASING ASSEMBLY FOR DESICCANT ELEMENT HOUSING

[75] Inventor: Matthew D. Mitsch, Pittsburgh, Pa.

[73] Assignee: Westinghouse Air Brake Company, Wilmerding, Pa.

[21] Appl. No.: 798,774

[22] Filed: Feb. 11, 1997

[51] Int. Cl.[6] ............................................. B01D 53/02
[52] U.S. Cl. ............................ 96/144; 96/147; 96/149; 96/151; 55/DIG. 17
[58] Field of Search ................ 55/518, DIG. 17, 55/515, 503; 96/149, 151, 138, 147, 144

[56] References Cited

U.S. PATENT DOCUMENTS

| | | | |
|---|---|---|---|
| 2,593,132 | 4/1952 | Gannon | 96/149 |
| 3,572,008 | 3/1971 | Hankison | 55/DIG. 17 |
| 4,015,959 | 4/1977 | Grote | 55/518 |
| 4,108,617 | 8/1978 | Frantz | 55/DIG. 17 |
| 4,336,042 | 6/1982 | Frantz et al. | 55/DIG. 17 |
| 4,468,239 | 8/1984 | Frantz | 55/DIG. 17 |
| 4,544,385 | 10/1985 | Tanaka | 55/DIG. 17 |
| 5,427,609 | 6/1995 | Zoglman et al. | 96/149 |

*Primary Examiner*—Jay H. Woo
*Assistant Examiner*—Robert Hopkins
*Attorney, Agent, or Firm*—James Ray & Associates

[57] ABSTRACT

A casing assembly of a desiccant housing houses desiccant in an air dryer system. The casing assembly includes a casing portion, a retainer, two porous plates, and a mechanism for compacting the desiccant. The casing portion defines a channel between two sleeves that channels moisture-bearing air from an inlet of a head end out a tail end of the casing portion. An inner sleeve defines a flow chamber between the ends. The head end features an inner seat face that seals against an inner sealing flange of a main portion of the housing. The head end features an outer seat face that connects to an outer sealing flange of the main portion. The inlet communicates with a supply port of the main portion from which the moisture-bearing air is received during a drying mode of operation of the system. An outlet of the head end communicates with a delivery port of the main portion out of which dried air is directed during the drying mode. The retainer affixes to the inner sleeve within the flow chamber at the head end. One plate abuts an interior side of the retainer within the flow chamber. The other plate is slidably disposed within the flow chamber near the tail end. The compacting means connects to an inner face of the tail end and abuts the other plate thereby compacting the desiccant between the porous plates. The tail end features an outer seat face that connects to a cover portion of the housing.

17 Claims, 5 Drawing Sheets

CASING ASSEMBLY FOR DESICCANT ELEMENT HOUSING

CROSS-REFERENCE TO RELATED APPLICATIONS

This application is related to application Ser. No. 08/713, 782 now U.S. Pat. No. 5,715,621 and Ser. No. 08/713,471 now U.S. Pat. No. 5,689,893 entitled Regenerative Desiccant Air Dryer and Desiccant Canister With Positioning Bore, respectively, both filed Sep. 13, 1996, and allowed thereafter. These patent applications are assigned to the assignee of the present invention, and their teachings are incorporated into the present document by reference.

FIELD OF THE INVENTION

The present invention generally relates to a system for drying air supplied by a compressor unit for use in a pneumatic system. More particularly, the invention pertains to a casing assembly of a desiccant housing for housing a desiccant element in an air dryer system. Still more particularly, the invention pertains to a casing assembly featuring a casing portion that at a head end sealingly connects to a main portion of the housing and at a tail end sealingly connects to a cover portion of the housing such that all three portions form the desiccant housing.

BACKGROUND OF THE INVENTION

Air dryer systems remove moisture vapor from a stream of compressed air into which the air dryer system is incorporated. An air dryer system employs one or more standard desiccant element housings each of which contains a moisture absorbing material (hereafter desiccant) to extract the moisture from the air. In air dryer systems having one desiccant element housing, the housing through its desiccant absorbs the moisture suspended in the compressed air passing through it until the compressor stops operating after a preset time. By design, this type of air dryer system then automatically flushes a quantity of the dried compressed air stored in a purge volume back through the housing to draw out the moisture contained in the desiccant. The stream of compressed air with the revaporized moisture it carries is then discharged to the atmosphere thereby regenerating the desiccant contained in the desiccant element housing.

In air dryer systems having two desiccant element housings, the air dryer system alternately switches between two cycles. In the first cycle, the air dryer system removes moisture from air passing through a first desiccant element housing while purging from a second desiccant element housing moisture it has previously collected. In the second cycle, the air dryer system removes moisture from air passing through the second desiccant element housing while purging from the first desiccant element housing moisture it has previously collected.

Prior art air dryer systems generally employ the standard desiccant element housing(s) to perform the air drying function. When it comes time to replace the desiccant within a housing, however, the design of the standard housing typically requires that nearly all of the housing has to be removed to get access to the desiccant. In the type of standard desiccant element housing in which the desiccant is contained within a canister or comes in block form, the standard housing generally retains the desiccant through a tight press fitting or interference fitting of the desiccant within the housing. The fit of the desiccant into the housing is so tight that it typically must be forcibly inserted into the housing during installation and forcibly pulled from the housing during removal with the aid of the appropriate tools.

The standard desiccant housing design thus presents a number of shortcomings. First, the process of installing the desiccant into the housing is quite strenuous and takes too much time. Second, in those standard desiccant housings in which the desiccant is contained within a canister, one can not be sure whether the canister is properly aligned within the housing so that the top of the canister seats against and makes an air tight seal with a sealing face of the housing. Third, removal of such a canister from the housing is often quite difficult because of its tight fit within the housing. For these reasons, a novel casing assembly of a desiccant element housing that does not exhibit the these disadvantages is described and claimed in this document.

The present invention can be applied to a wide variety of pneumatic systems. Typical of the types of pneumatic systems to which the present system could be applied include the pneumatic brake systems of passenger transit and freight railroad trains, subway trains and various other types of rail related transportation systems. Further examples include the pneumatic brake systems of various truck transport vehicles. Other types of pneumatic systems to which the present invention could be applied may indeed be found outside the transportation field.

It should be noted that the foregoing background information is provided to assist the reader in understanding the present invention. Accordingly, any terms used herein are not intended to be limited to any particular narrow interpretation unless specifically stated otherwise in this document.

OBJECTIVES OF THE INVENTION

It is, therefore, one of the primary objectives of the present invention to provide a casing assembly of a desiccant housing for housing a desiccant element in an air dryer system.

Another objective of the present invention is to provide a casing assembly featuring a casing portion that at a head end sealingly connects to a main portion of the desiccant housing and at a tail end sealingly connects to a cover portion of the housing such that all three portions form the desiccant housing.

Yet another objective of the present invention is to provide a casing assembly featuring a casing portion that at a tail end easily connects sealingly to a cover portion of a desiccant housing so that the desiccant element housed in the assembly can be easily accessed and removed via the cover portion of the housing.

Still another objective of the present invention is to provide a casing assembly of a desiccant housing featuring a means for compacting the desiccant between porous plates in a flow chamber defined by the casing assembly so that the desiccant distributes uniformly within the flow chamber.

In addition to these objectives and advantages, various other objectives and advantages will become more readily apparent to persons skilled in the air dryer system art from a reading of the detailed description section of this document. The other objectives and advantages will become particularly apparent when the detailed description is considered in conjunction with the attached drawings and with the appended claims.

SUMMARY OF THE INVENTION

In a presently preferred embodiment, the present invention provides a casing assembly of a desiccant element housing for housing a desiccant element in an air dryer system. The casing assembly includes a casing portion, a retaining means, a head end porous plate, a tail end porous plate and a means for compacting the desiccant element. The casing portion has inner and outer sleeves with a channel defined between the sleeves. The channel channels moisture-bearing air from an inlet port of a head end of the casing portion out a tail end of the casing portion. The inner sleeve defines a flow chamber extending from the tail end to the head end. The head end features an inner seat face for sealing against an inner sealing flange of a main portion of the desiccant element housing. The head end also features an outer seat face for sealingly connecting to an outer sealing flange of the main portion of the desiccant element housing. This allows the inlet port to communicate with a supply port of the main portion from which the moisture-bearing air is received during a drying mode of operation of the air dryer system. It also allows an outlet port of the head end to communicate with a delivery port of the main portion out of which dried air is directed during the drying mode. The retaining means affixes to the inner sleeve within the flow chamber at the head end. The head end porous plate abuts an interior facing side of the retaining means within the flow chamber. The tail end porous plate is slidably disposed within the flow chamber of the inner sleeve near the tail end. The compacting means is connected to an inner face of the tail end and abuts the tail end porous plate. It compacts the desiccant element within the flow chamber between the porous plates. The tail end also features an outer seat face for sealingly connecting to a sealing flange of a cover portion of the desiccant element housing. The cover portion redirects the moisture-bearing air channeled out the tail end into the flow chamber for drying by the desiccant element during the drying mode of operation of the air dryer system.

BRIEF DESCRIPTION OF THE DRAWINGS

FIG. 3b is a cross-sectional view of a main portion of the desiccant element housing illustrated in FIG. 3a.

DETAILED DESCRIPTION OF THE INVENTION

Before describing the present invention in detail, the reader is advised that, for the sake of clarity and understanding, identical components having identical functions in each of the accompanying drawings have been marked where possible with the same reference numerals in each of the Figures in this document.

Figure 1:
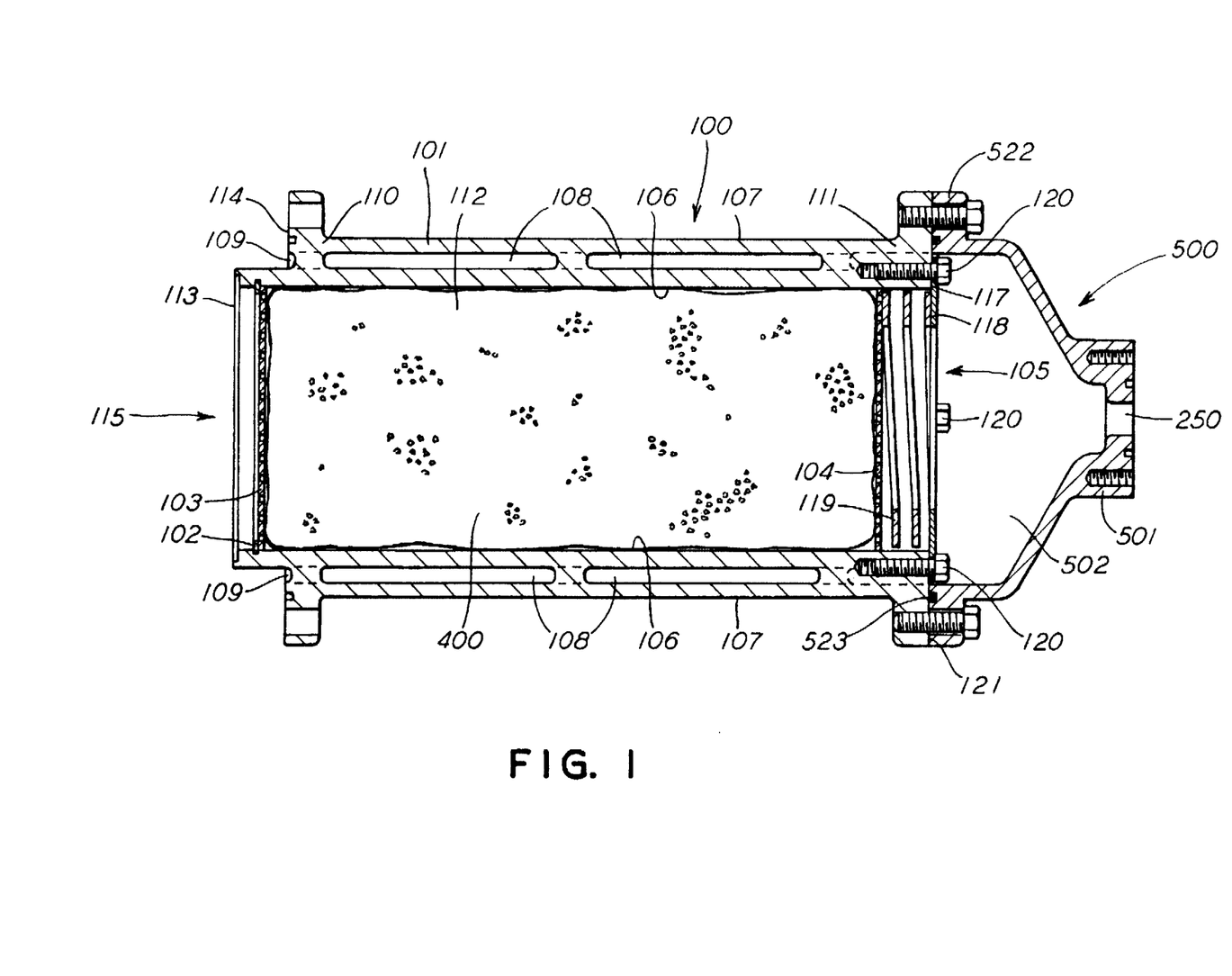
FIG. 1 is a cross-sectional view of a casing assembly of a desiccant element housing according to the present invention.
Figure 2A:
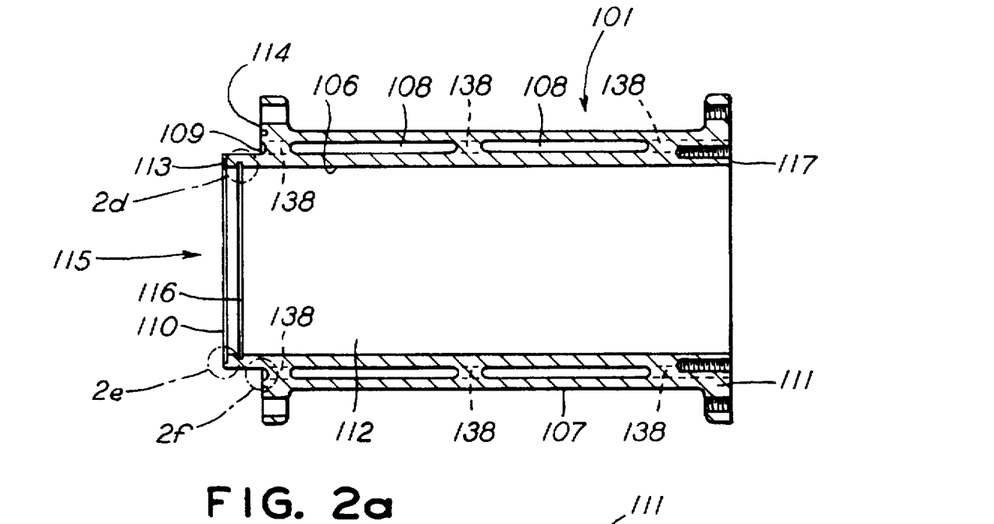
FIG. 2a is a cross-sectional view of a casing portion of the casing assembly illustrated in FIG. 1.
Figure 2B:
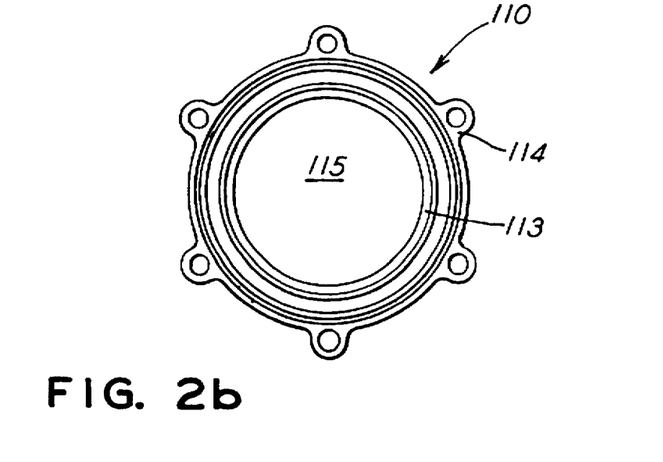
FIG. 2b is a top view of a head end of the casing assembly illustrated in FIG. 1.
Figure 2C:
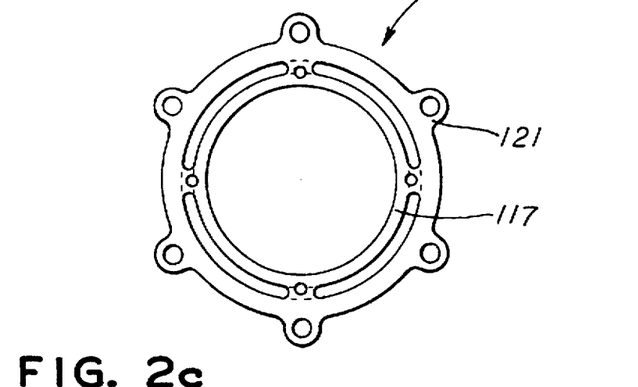
FIG. 2c is a bottom view of a tail end of the casing assembly illustrated in FIG. 1.
Figure 2D:
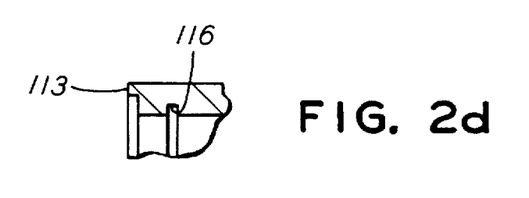
FIG. 2d is a partial cross-sectional view of a retaining ring groove of the casing assembly shown in FIG. 1.
Figure 2E:
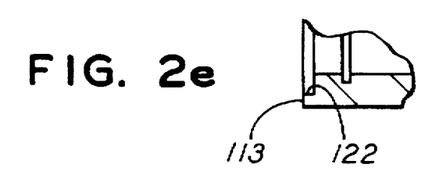
FIG. 2e is a partial cross-sectional view of an o-ring groove in a head end of the casing assembly shown in FIG. 1.
Figure 2F:
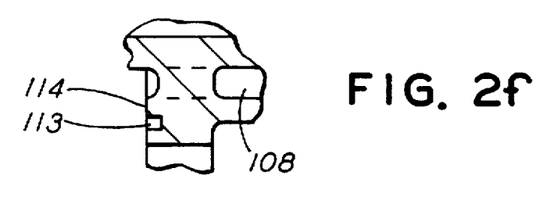
FIG. 2f is a partial cross-sectional view of another o-ring groove in a head end of the casing assembly shown in FIG. 1.
Figure 2G:
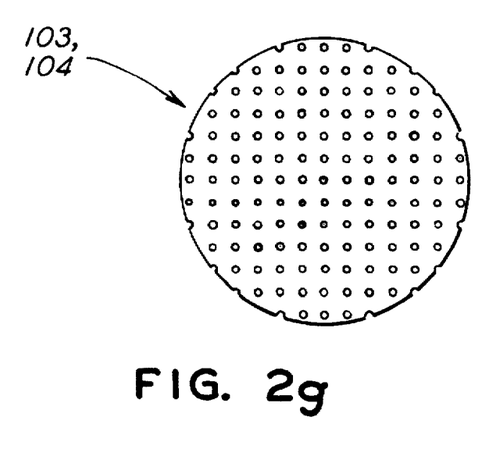
FIG. 2g is a top view of a porous plate according to the present invention.
Figure 2H:
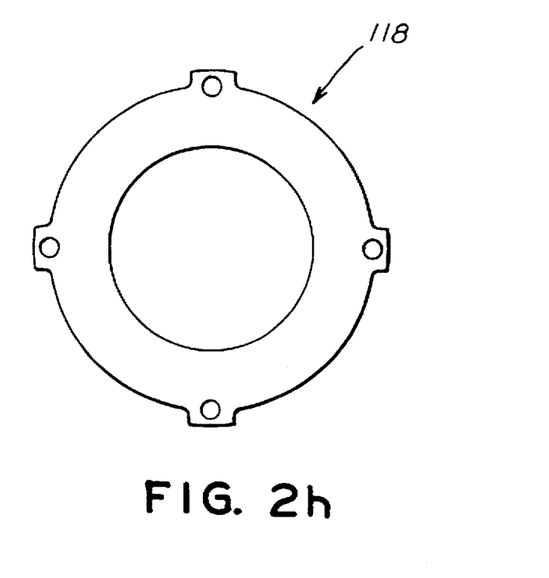
FIG. 2h is a top view of a spring retaining plate according to the present invention.
Figure 3A:
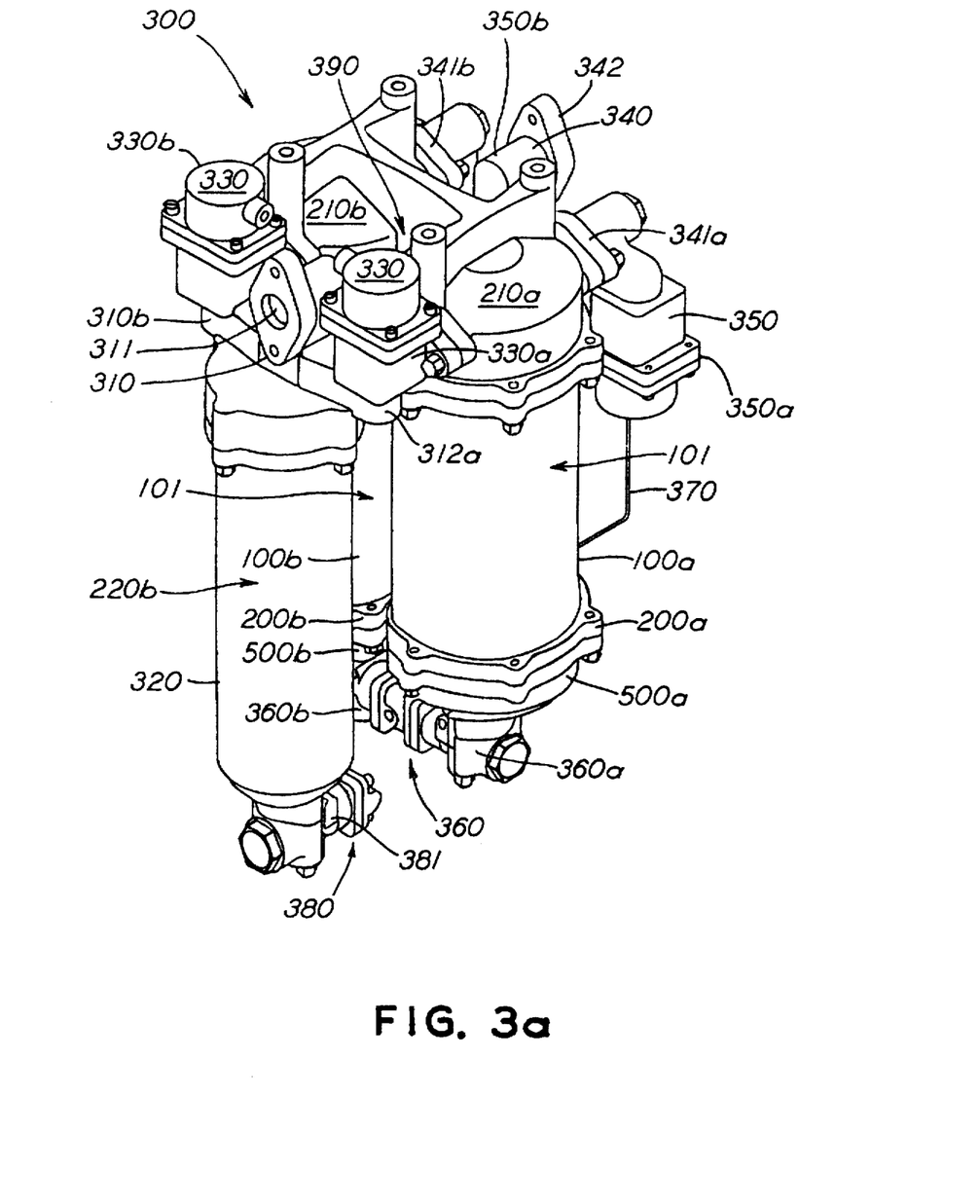
FIG. 3a is a perspective view of a twin tower air dryer system featuring two desiccant element housings each of which featuring the casing assembly of the present invention.
Figure 3B:
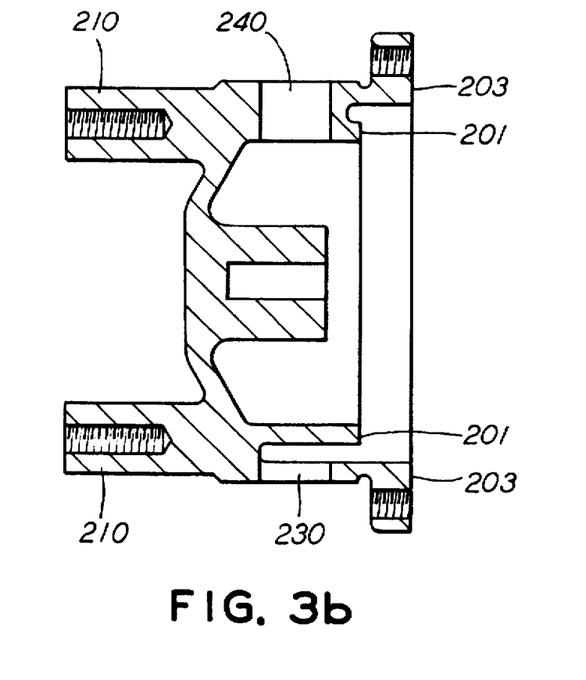

FIGS. 1 through 3 illustrate the essential details of a casing assembly of a desiccant element housing of an air dryer system. The casing assembly, generally designated 100, is designed to house a desiccant element 400 of the bag variety having the characteristics shown in FIG. 1. The casing assembly 100 may be used in many types of air dryer systems such as the one or two tower (i.e., desiccant housing) systems alluded to in the background. FIG. 3, for example, illustrates a twin tower system 300 featuring two desiccant element housings 200a and 200b each of which embodying the casing assembly 100 of the present invention. The twin tower air dryer system 300 operates as indicated in one of the documents incorporated herein by reference.

Referring to FIG. 1, the present invention provides a casing assembly 100 of a desiccant element housing for housing a desiccant element 400 in an air dryer system. In a presently preferred embodiment, the casing assembly 100 includes a casing portion 101, a retaining means 102, a head end porous plate 103, a tail end porous plate 104 and a means 105 for compacting the desiccant element 400.

The casing portion 101 is best illustrated in FIG. 2a. The casing portion 101 has an inner sleeve 106 and an outer sleeve 107 with a channel 108 defined between the sleeves. The sleeves preferably connect to each other via a plurality of connecting tabs 138, as best shown in FIGS. 1 and 2a. The channel 108 channels moisture-bearing air from an inlet port 109 of a head end 110 of casing portion 101 out a tail end 111 of casing portion 101. The inner sleeve 106 defines a flow chamber 112 extending from the tail end 111 to the head end 110. The head end 110 as illustrated in FIGS. 1, 2a and 2b features an inner seat face 113 that seals against an inner sealing flange 201 of a main portion 210 of desiccant housing 200. The inner sealing flange 201 is shown in FIG. 3b. FIG. 3a illustrates two main portions 210a and 210b, one for each desiccant element housing 200a and 200b.

The head end 110 also features an outer seat face 114 that sealingly connects to an outer sealing flange 203 of main portion 210 of desiccant element housing 200. Given that inner and outer seat faces 113 and 114 of casing assembly 100 seal against inner and outer sealing flanges 201 and 203 of main portion 200 of desiccant housing 200, this allows inlet port 109 to communicate with a supply port 230 of main portion 210 from which the moisture-bearing air is received during a drying mode of operation of the air dryer system. It also allows an outlet port 115 of head end 110 to communicate with a delivery port 240 of main portion 200 out of which dried air is directed during the drying mode.

The retaining means 102 affixes to inner sleeve 106 within flow chamber 112 at the head end 110 of casing portion 101. The retaining means 102 is a ring or like device that affixes within a groove 116 defined within inner sleeve 106 in the head end 110, as best shown in FIGS. 2a and 2d. The head end porous plate 103 abuts an interior facing side of retaining ring 102 within flow chamber 112 as illustrated in FIG. 1. The tail end porous plate 104 is slidably disposed within flow chamber 112 near tail end 111.

The compacting means 105 is connected to an inner face 117 of tail end 111 and abuts the tail end porous plate 104. It compacts the desiccant element 400 within flow chamber 112 between the porous plates 103 and 104. Whether used with a desiccant element in bag form or even loose pelletized form, the compacting means 105 assures that the desiccant is uniformly distributed within the flow chamber 112. Compressed by the compacting means 105, the desiccant tends fill all available space between the porous plates 103 and 104, as the desiccant is even forced outwardly against the walls of inner sleeve 106.

The compacting means 105 includes a spring retaining plate 118 as shown in FIGS. 1 and 2h and a spring 119 as shown FIG. 1. The spring retaining plate 118 affixes via a plurality of screws or bolts 120 to the inner face 117 of tail end 111, as illustrated in FIGS. 1 and 2h. The spring 119 is situated between spring retaining plate 118 and tail end porous plate 104 so as to maintain a compressive force upon desiccant element 400 disposed in flow chamber 112 between porous plates 103 and 104.

The porous plates 103 and 104 are of the type shown in FIG. 2g. Each plate has a plurality of apertures that allow flow of air while trapping any loose desiccant as well other airborne particulates whose dimensions exceed the size of the apertures.

The tail end 111 as shown in FIGS. 1 and 2c also features an outer seat face 121 that sealingly connects to a sealing flange 522 of a cover portion 500 of desiccant housing 200. The cover portion 500 redirects the moisture-bearing air that is channeled out of tail end 111. Specifically, the cover portion 500 redirects the flow of moisturized air received from channel 108 into the flow chamber 112 where it is dried by desiccant element 400 during the drying mode of operation of air dryer system.

The casing assembly 100 connects at its head end 110 to the main portion 210 via a plurality of bolts or screws, as shown in FIGS. 1 and 3b. Specifically, the outer seat face 114 of head end 110 connects via bolts to the outer sealing flange 203 of main portion 210 of desiccant housing 200. Likewise, the casing assembly 100 connects at its tail end 111 to cover portion 500 via a plurality of bolts or screws, as shown in FIGS. 1 and 2c. Specifically, the outer seat face 121 of tail end 111 connects via bolts to sealing flange 522 of cover portion 500. When connected in this manner, the main portion 210, casing assembly 100 and cover portion 500 together form desiccant housing 200. FIG. 3a, for example, illustrates two desiccant housings 200a and 200b in the twin tower air dryer system 300. Each desiccant housings 200a and 220b has a main portion (e.g., 210a/ 210b), a casing assembly (e.g., 100a/ 100b) and a cover portion (e.g., 500a/ 500b).

The three portions of the desiccant housing when connected to each other seal against each other via o-rings. Specifically, the casing assembly 100 seals against the main portion 210 via two O-rings. The inner seat face 113 of head end 110 defines a groove 122 into which one o-ring retains. The outer seat face 114 of head end 100 defines a groove 123 into which the other o-ring retains. These two grooves are best shown in FIGS. 2a, 2e and 2f. These two seals serve to isolate inlet port 109 and outlet port 115 from each other and from atmosphere. Likewise, the cover portion 500 seals against casing assembly 100 via a third o-ring. The sealing flange 522 of cover portion 500 defines a groove 523 into which this third o-ring retains. It is this seal that allows casing assembly 100 to seal against cover portion 500.

The cover portion 500 may take any one of a variety of shapes, though preferably the shape illustrated in FIG. 1. The cover portion 500 includes a cover body 501. The cover body 501 features the sealing flange 522 whose surface is designed to seal against and connect to outer seat face 121 of casing portion 101.

The cover body 501 defines a focal chamber 502 and a purge port 250 such that focal chamber 502 extends from sealing flange 522 to purge port 250. The shape of focal chamber 502 is configured so that the moisture-bearing air received from channel 108 of casing portion 101 is efficiently redirected into flow chamber 112 of casing portion 101 during a drying mode of operation of an air dryer system. The shape of focal chamber 502 is also configured so that the remoisturized air received from flow chamber 112 is directed to purge port 250 for expulsion to atmosphere during a purge mode of operation of the air dryer system. The documents incorporated herein by reference describe the operation of air dryer systems in general and in doing so explain the significance of the drying and purging modes of operation. The modes of operation, of course, are well known in the air drying art.

The desiccant element 400 illustrated in FIG. 1 preferably takes the form of a bag of desiccant so as to take full advantage of the present invention 100. Specifically, should loose desiccant pellets be used instead of bag desiccant, replacement of the desiccant would require removal of casing assembly 100 from the main portion 210 of desiccant housing 200. After the casing assembly 100 is removed then one would have to remove the compacting means 105 so as to dispose of the loose desiccant in an orderly fashion. The casing assembly 100 would then have to be reconnected to the main portion 210. Such reconnection necessarily involves making sure that the head end 110 of the casing assembly 100 is properly seated within main portion 210.

Replacement of a bag of desiccant, by contrast, would merely require removal of the cover portion 500 and the compacting means 105. One would need only to pull out the old bag desiccant and insert the new bag desiccant then reconnect the compacting means 105 and the cover portion 500. Because the casing assembly 100 need not be removed from main portion 100, there is no need for realignment of the head end 110 of casing assembly 100 within the main portion 210 of the desiccant housing 200. Such laborious realignment and connection is typical of prior art desiccant housings. Compared to prior art housings, the present invention allows easy access to and removal of the desiccant element 400.

Notwithstanding the preference that the present invention be used with bag desiccant, the casing assembly 100 may be used with loose pelletized desiccant such as a mesh white activated alumina desiccant. Should loose desiccant be used, one must, of course, use a pellet size whose diameter is larger than the diameter of the apertures of the porous plates 103 and 104.

While the presently preferred embodiment and related aspects have been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A casing assembly of a desiccant element housing for housing a desiccant element in a gas dryer system, said casing assembly comprising:

(a) a casing portion having an inner and an outer sleeve with a channel defined between said sleeves for channeling moisture-bearing gas from an inlet port of a head end of said casing portion out a tail end of said casing portion, said inner sleeve defining a flow chamber extending from said tail end to said head end;

(b) said head end featuring (i) an inner seat face for sealing against an inner sealing flange of a main portion of said housing and (ii) an outer seat face for sealingly connecting to an outer sealing flange of said main portion of said housing so that (A) said inlet port communicates with a supply port of said main portion from which said moisture-bearing gas is received during a drying mode of operation of said gas dryer system and (B) an outlet port of said head end communicates with a delivery port of said main portion out of which dried gas is directed during said drying mode;

(c) a retaining means for affixing to said inner sleeve at said head end thereof within said flow chamber;

(d) a head end porous plate abutting an interior facing side of said retaining means within said flow chamber;

(e) a tail end porous plate slidably disposed within said flow chamber of said inner sleeve near said tail end;

(f) a means, connected to said tail end and abutting said tail end porous plate, for compacting said desiccant element within said flow chamber between said porous plates; and (g) said tail end featuring an outer seat face for sealingly connecting to a sealing flange of a cover portion of said housing so that said moisture-bearing gas channeled out said tail end redirects into said flow chamber for drying by said desiccant element during said drying mode of operation of said gas dryer system.

2. The casing assembly recited in claim 1 wherein said means for compacting said desiccant element includes:

(a) a spring retaining plate affixed to an inner face of said tail end; and (b) a spring compressively situated between said spring retaining plate and said tail end porous plate so as to maintain a compressive force upon said desiccant element disposed in said flow chamber between said porous plates.

3. The casing assembly recited in claim 2 wherein said spring retaining plate affixes via a plurality of screws to said inner face of said tail end.

4. The casing assembly recited in claim 1 wherein said retaining means is a retaining ring that affixes within a groove defined within said inner sleeve at said head end thereof.

5. The casing assembly recited in claim 1 wherein said inner and said outer sleeves of said casing portion connect to each other via a plurality of connecting tabs.

6. The casing assembly recited in claim 1 wherein:

(a) said outer seat face of said head end connects via a plurality of bolts to said outer sealing flange of said main portion; and (b) said outer seat face of said tail end connects via a plurality of bolts to said sealing flange of said cover portion.

7. The casing assembly recited in claim 1 wherein:

(a) said inner seat face of said head end seals against said inner sealing flange of said main portion via an o-ring retained in a groove defined in said inner seat face;

(b) said outer seat face of said head end seals against said outer sealing flange of said main portion via an o-ring retained in a groove defined in said outer seat face; and (c) said outer seat face of said tail end seals against said sealing flange of said cover portion via an o-ring retained in a groove defined in said sealing flange of said cover portion.

8. The casing assembly recited in claim 7 wherein:

(a) said outer seat face of said head end connects via a plurality of bolts to said outer sealing flange of said main portion; and (b) said outer seat face of said tail end connects via a plurality of bolts to said sealing flange of said cover portion.

9. The casing assembly recited in claim 1 wherein said cover portion defines a purge port through which a stream of remoisturized gas is expelled from said desiccant element housing during a purge mode of operation of said gas dryer system.

10. A casing portion for forming a casing assembly of a desiccant element housing of a gas dryer system, said casing assembly including a retaining ring, a pair of porous plates and a means for compacting a desiccant element housed within said casing assembly, said casing portion comprising:

(a) a pair of concentric sleeves interconnected with a plurality of tabs with a channel defined between said sleeves, said channel extending from an inlet port of a head end of said casing portion to a tail end of said casing portion, an inner one of said sleeves defining a cylindrical flow chamber extending from said tail end to said head end;

(b) said head end featuring (i) an inner seat face for sealing against an inner sealing flange of a main portion of said housing and (ii) an outer seat face for sealingly connecting to an outer sealing flange of said main portion of said housing so that (A) said inlet port is communicable with a supply port of said main portion and (B) an outlet port of said head end is communicable with a delivery port of said main portion;

(c) said head end defining within said inner sleeve a groove into which is affixable a retaining ring having an interior facing side against which one of said porous plates is abuttable;

(d) said tail end featuring an inner face to which is affixable said compacting means such that said compacting means compresses the other of said porous plates into said desiccant element so as to maintain a compressive force upon said desiccant element between said porous plates in said flow chamber; and (e) said tail end featuring an outer seat face for sealingly connecting to a sealing flange of a cover portion of said housing.

11. The casing portion recited in claim 10 wherein said inner face of said tail end defines a plurality of screw holes for affixing thereto said compacting means via screws.

12. The casing portion recited in claim 10 wherein:

(a) said outer seat face of said head end is connectable via a plurality of bolts to said outer sealing flange of said main portion; and (b) said outer seat face of said tail end is connectable via a plurality of bolts to said sealing flange of said cover portion.

13. The casing portion recited in claim 10 wherein:

(a) said inner seat face of said head end defines a groove into which an o-ring is retainable for sealing said inner seat face against said inner sealing flange of said main portion; and (b) said outer seat face of said head end defines a groove into which an o-ring is retainable for sealing said outer seat face against said outer sealing flange of said main portion.

14. The casing portion recited in claim 13 wherein:

(a) said outer seat face of said head end is connectable via a plurality of bolts to said outer sealing flange of said main portion; and (b) said outer seat face of said tail end is connectable via a plurality of bolts to said sealing flange of said cover portion.

15. A cover portion of a desiccant element housing of a gas dryer system, said cover portion comprising a cover body having a sealing flange for sealingly connecting to an outer seat face of a tail end of a casing portion of said housing, said cover body defining a focal chamber and a purge port such that said focal chamber extends from said sealing flange to said purge port, said focal chamber for (i) redirecting moisture-bearing gas received from a channel of said casing portion into a flow chamber of said casing portion during a drying mode of operation of said gas dryer system and (ii) for directing remoisturized gas received from said flow chamber to said purge port for expulsion to atmosphere during a purge mode of operation of said gas dryer system.

16. The cover portion recited in claim 15 wherein said sealing flange defines a groove into which an o-ring is retainable for sealing said sealing flange against said outer seat face of said tail end of said casing portion of said housing.

17. The cover portion recited in claim 16 wherein said sealing flange connects via a plurality of bolts to said outer seat face of said tail end of said casing portion of said housing.

* * * * *